United States Patent [19]
Schmitt et al.

[11] 3,874,794
[45] Apr. 1, 1975

[54] METHOD AND APPARATUS FOR PHOTOMETRIC ANALYSIS OF SUBSTANTIALLY COLORLESS COMPONENTS OF SAMPLE

[75] Inventors: Albert Schmitt; Hans Vogel; Toma Tomoff, all of Uberl Ingen, Bodensee, Germany

[73] Assignee: Bodenseewerk Perkin-Elmer & Co. GmbH, Uberlingen/Bodensee, Germany

[22] Filed: Apr. 20, 1973

[21] Appl. No.: 352,887

[30] Foreign Application Priority Data
Apr. 21, 1972  Germany............................ 2219552

[52] U.S. Cl................ 356/36, 23/230 R, 23/230 B, 356/39, 356/184
[51] Int. Cl........ G01n 1/00, G01n 33/16, G01j 3/48
[58] Field of Search............... 356/36, 184, 180, 39; 23/230 B, 230 R

[56] References Cited
UNITED STATES PATENTS
3,511,607  5/1970  Green............................. 23/230 B
3,523,756  8/1970  Loebl............................. 23/230 B
3,645,691  2/1972  Knapp et al..................... 23/230 B
3,723,062  3/1973  Dahms............................ 23/230 B

*Primary Examiner*—Vincent P. McGraw
*Attorney, Agent, or Firm*—Daniel R. Levinson; John K. Conant

[57] ABSTRACT

This is a method for quantative photometric determination of substantially colorless components of a sample by reaction with a color-producing reagent and subsequent determination of the colored reaction product at a specific wavelength. The method is particularly adapted to determined at least two components in the sample, the second of which may require the addition of a second reagent, for example, to chemically "free" the second component. The technique first measures the optical transmission of a known amount of sample diluted by a known amount of diluent to determine a "blank" absorbance value; a known quantity of a color-producing reagent is then added in excess and an absorbance value is determined; and finally, a metered quantity of a reagent which frees the combined component is added and a third absorbance value is measured. From there three absorbance values the concentration of each of the two components may be readily determined.

6 Claims, 6 Drawing Figures

METHOD AND APPARATUS FOR PHOTOMETRIC ANALYSIS OF SUBSTANTIALLY COLORLESS COMPONENTS OF SAMPLE

PATENT APPLICATION

This invention relates to a method for the quantitative photometric determination of colorless or only slightly colored components in a sample by reaction with a color-producing reagent and subsequent determination of the absorbance (extinction) of the colored reaction product at a specific wavelength or in a specific (narrow) wavelength range. The method is also directed to the determination of at least two components in a sample, a first component being determinable directly and a second one only after adding another reagent. It is also directed to the determination of a component of the sample present partially as a free and partially as a "combined" quantity.

This invention also relates to a device for automatically and reproducibly carrying out said method, comprising a photometer for measuring the optical transmission, an arrangement connected with it for evaluating the measured values and for recording absorbance (extinction) and/or concentration values, a device operating according to the diluter principle for a loss-free and contamination-free metering and feeding of a sample volume into a reaction vessel by dilution by a metered quantity of a diluent, and further comprising reservoirs, feeding devices and conduits for the introduction of metered quantities of reagents into the reaction vessel.

Photometric analytical determinations are generally carried out such that first a blank value is determined, in particular, a metered sample volume, which is equal to the analytical volume, is caused to react in the same manner as during the actual determination with the exception that instead of the color-producing reagent a colorless diluent is added. The photometric determination of several components in a sample is generally carried out such that each of the components being measured is caused to react in a separate sample volume with the required reagents and is determined, a blank value being determined additionally in the aforesaid manner for each individual measurement. Therefore, at least double the sample volume otherwise necessary for the determination is always required, this being disadvantageous, particularly in connection with clinical-chemical analyses, as these larger sample volumes are not always available in such analyses. Moreover, the separate multiple determination of the blank value and of the individual values involves an otherwise unnecessary reduction in the measuring accuracy (i.e., experimental errors in each determination may be additive). Another disadvantage resides in the fact that many reactions require some time for the quantitative or nearly quantitative formation of the colored product, in the absorption band of which the photometric determination is made. Generally, the measurement is not carried out at the end of the color-producing reaction, but at a specific instant which, for "safety" reasons (i.e., to insure no end point error), is selected much later. Though this disadvantage can partly be compensated by "nesting" in each other several such determinations (i.e., taking repeated readings at different times of the absorbance value of different samples), however, this involves an increased danger of mix-up in the association of the measured result to each of the respective samples.

It is an object of this invention to so simplify the photometric analytical method of the type indicated that a smaller sample volume is required for carrying out the method, while at the same time the consumption of reagents is reduced.

It is another object of this invention to reduce the time required for carrying out the method to such an extent that the reactions and measurements can be carried out directly successively, whereby a "nesting" (intermingling) of different determinations can be omitted, and errors in the association of the measured results relative to different samples are avoided.

According to the invention this object is achieved by providing that: in a first step of the method a first metered sample volume is introduced into a cell by dilution by a metered quantity of a diluent, and after intimate mixing a first optical transmission value corresponding to the blank value is measured; and in a second step a metered quantity of a color-producing reagent is added and after intimate mixing a second optical transmission value is measured.

For the determination of at least two components in a sample, the first component being determinable directly and a second component only after adding another reagent, according to the method of the invention, in a third (additional) step a metered quantity of a second color-producing reagent is added and after intimate mixing a third optical transmission value is measured.

According to the method of the invention also a sample component present both in a free and in a combined quantity can be determined in that in the second step a metered excess quantity of the color-producing reagent is added and a transmission value corresponding to the free partial quantity is measured; while in the third step a metered quantity of a reagent setting free the combined partial quantity is added, and a transmission value corresponding to the total quantity is measured. In the method according to the invention the measured transmission values are fed into a computing and recording device and are recorded as absorbance (extinction) values and/or concentration values. Moreover, the change of the absorbance (extinction) or change of the concentration with time can be recorded.

According to the preferred version of the invention, the supply of the sample and reagent volumes to the cell successively in a controlled time sequence as well as the intimate mixing, measurement and cleaning are carried out automatically.

The device according to the invention for the automatic and reproducible carrying out of the aforesaid method utilizes as a reaction and measuring vessel a cell which is stationary in the path of rays of the photometer during the whole procedure, as well as a control unit for controlling the successive operations.

The device of the invention is expediently provided with a device for intimately mixing the cell contents prior to each measurement of the optical transmission, as well as with an arrangement known per se for cleaning the cell prior to or after each procedure.

An illustrative embodiment of this invention will now be described more fully with reference to the accompanying drawings in which like reference numerals depict like parts.

The illustrative exemplary embodiment is particularly directed solely for purposes of concreteness to the determination of the bilirubin proportion (relative concentration) in serum which is contained therin in two fractions, namely, as free and as combined bilirubin.

Figure 1:
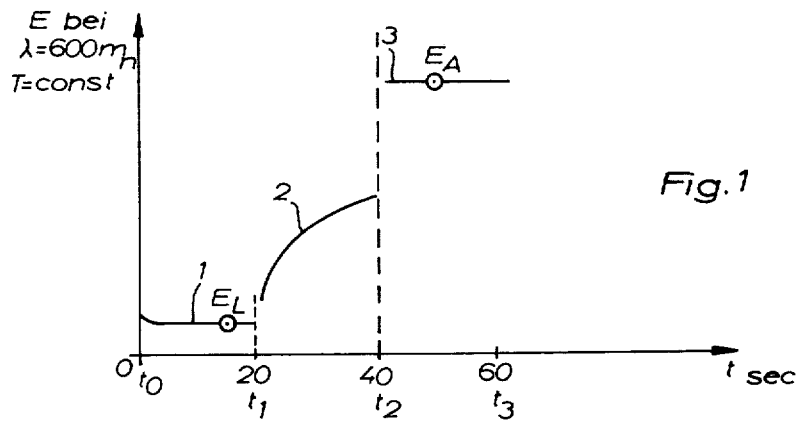
FIG. 1 illustrates the chronological sequence of the change of the absorbance (extinction) during the determination of free bilirubin according to the method of the invention.

For a better understanding of the method of the invention and of how it is carried out, the prior art method (L. Jendrassik, P. Grof; Biochem. Periodical 297,81, 1938) of the bilirubin determination in serum is first described in detail. For this determination, the following solutions are used:

Solution of common salt:0.9% in water

Tartrate solution:0.4 M potassium-sodium tartrate tartrate in 1 N caustic soda

Diazo reagent:a solution of diazotised sulfanilic acid from solutions, mixed directly prior to the reaction, of sulfanilic acid (0.5%) in 0.15 n hydrochloric acid and sodium nitrite (0.5%) in water Caffeine solution:0.1 M caffeine, 0.15 M sodium benzoate, 0.5 M sodium acetate in water.

To determine the blank value, first a sample volume of 200 µl (microliters) is combined and mixed with 1,250 µl (microliters) is combined and mixed with 1,250 µl common salt solution, and after 4 minutes 1,000 µl tartrate solution are added. After another 4 minutes, while the sample is intimately mixed during this period, the optical transmission of this blank sample is measured in a narrow wavelength range at about 600 nm. (nanometers).

To determine the free bilirubin, thereafter a sample volume of 200 µl, is combined and mixed with 1,000 µl common salt solution, as well as 250 µl diazo reagent, and after 4 minutes 1,000 µl tartrate solution are added. After another 4 minutes, while the sample is intimately mixed during this period, the optical transmission is measured at 600 nm.

To find the blank value for the total bilirubin determination a sample volume of 200 µl is combined and mixed with 1,250 µl caffeine solution, and after 10 minutes 1,000 µl tartrate solution are added. After another 5 minutes, while the sample is intimately mixed during this period, the optical transmission is measured at 600 nm.

To determine the total bilirubin, subsequently a sample volume of 200 µl is combined and mixed with 1,000 µl caffeine solution, as well as 250 µl diazo reagent, and after 10 minutes 1,000 µl tartrate solution are added. After another 5 minutes, while the sample is intimately mixed during this period, the optical transmission is measured at 600 nm.

From the difference in the transmission of the respective sample and "blank" sample the extinction (absorbance) of the dye at 600 nm is obtained, which according to a given calibration curve is proportional to the concentration of free bilirubin, or total bilirubin, respectively. The proportion of combined bilirubin is then obtained from the difference of total bilirubin and free bilirubin.

FIG. 1 illustrates the chronological sequence of the method according to the invention. After intimate mixing of the sample with the common salt solution a constant transmission corresponding to the extinction value $E_L$ is obtained; when the diazo reagent is added at the instant $t_1$ after intimate mixing the reaction of the free bilirubin with the reagent takes place by forming the dye also absorbing at 600 nm. The reaction is relatively slow so that the increase in the extinction (absorbance) corresponding to the decrease in the transmission can readily be observed in the interval referenced 2. At the instant $t_2$, the diazo coupling is interrupted and a new transmission value corresponding to the extinction (absorbance) $E_A$ of the dye in this solution is obtained, which is constant in time. The initial value of the extinction $E_L$ after corresponding diluting correction yields the blank value $E_{AL}$, so that the true extinction (absorbance) of the formed dye is obtained from the difference $E_A - E_{AL}$, which according to the prior art calibration curve is a measure of the concentration of the free bilirubin.

Figure 2:
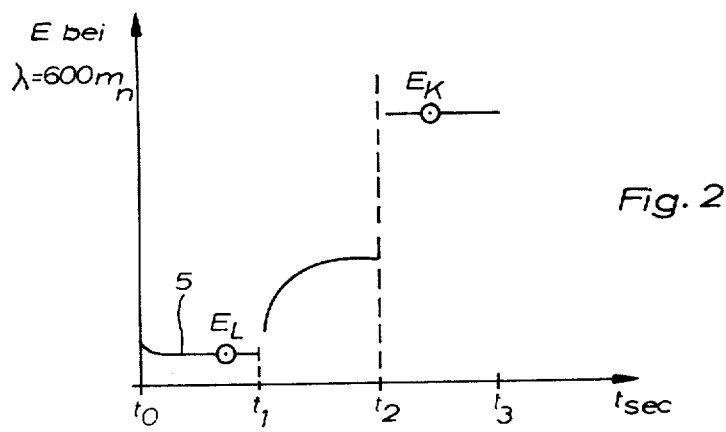
FIG. 2 illustrates the chronological sequence of the change of the absorbance (extinction) during the determination of the total bilirubin according to the method of the invention.

FIG. 2 illustrates accordingly the chronological sequence of the determination of the total bilirubin. From the extinction value determined in this measurement the total bilirubin concentration is obtained in a similar manner.

FIGS. 1 and 2 illustrate that the execution of the method of the invention requires considerably shorter times than prior art methods. In contrast to the relatively great waiting times of 8 or 14 minutes until determination of the required value, the formation of the dye being measured is already completed after approximately 20 seconds. Therefore, the two determinations can be carried out in a substantially shorter time.

According to the method of the invention, the blank value of the extinction $E_{AL}$ is calculated by a correction, carried out in the computing device, from the measured blank value of the transmission corresponding to the blank value $E_L$ of the extinction. The blank value $E_{AL}$ corresponds to the extinction of a solution of the serum in the used media at the wavelength observed. The blank value $E_L$ is the extinction value $E_S$ of the serum itself reduced by the dilution factor.

$$E_L = V_S/(V_S + V_{R1}) \cdot E_S$$

wherein $V_S$ is the volume of serum and $V_{R1}$ the volume of added common salt or caffeine solution, respectively. The blank value $E_{AL}$ which is required for the correct determination of the dye extinction, is $$E_{AL} = V_S/(V_S + V_{R1} + V_{R2} + V_{R3}) \cdot E_S$$

wherein $V_{R2}$ is the added volume of diazo reagent and $V_{R3}$ is the added volume of tartrate solution. From the above, $$E_{AL} = f \cdot E_L$$

wherein the correction factor is $$f = 1/[1 + (V_{R2} + V_{R3})/(V_S + V_{R1})]$$

This correction factor can easily be pre-established in the computing device. At the output of the device the extinction (absorbance) values of the dye ($E_A - E_{AL}$) or (the proportional) concentration values (given alternately in mol/l, g/100 ml, or as conventional in the range of clinical chemistry, in mg%, i.e., mg/100 ml serum) are indicated.

Another simplification and reduction in time of the method is obtained from the fact that the dye formation is practically completed after 20 seconds. In the prior art method with waiting times of 4 or 10 minutes, respectively, until interruption of the diazo coupling, coupling products of the sulfanilic acid diazonium salt are formed to a non-negligible extent also with other serum components such as the proteins. These coupling products have an absorption band at 530 nm similarly to the coupling product with bilirubin. In the prior art method, the addition of the alkaline tartrate solution effects a shift of the absorption of the bilirubin coupling product into the range about 600 nm. Since the coupling products formed in the side reaction do not experience such an absorption shift, in this manner a disturbance-free measurement of the bilirubin coupling product alone was rendered possible. Now, closer analysis has shown that the side reaction of the diazotised sulfanilic acid takes place much more slowly, so that for a sufficiently short investigating time the tartrate addition can be omitted and the extinction determination can be effected directly during the absorption of the bilirubin coupling product (at 530 nm). Thus, there is the possibility that the free bilirubin and the total bilirubin or the combined bilirubin, respectively, is determined in one single sample. This method is illustrated in its chronological sequence in FIG. 3.

Figure 3:
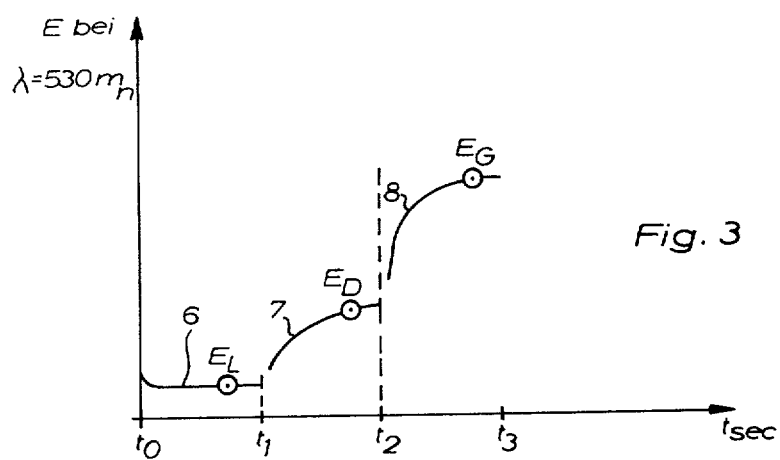
FIG. 3 illustrates the chronological sequence of the change of the absorbance (extinction) during the determination of free and total bilirubin according to the invention.

A 200 µl sample volume is combined with 1,000 µl common salt solution, and the transmission corresponding to the extinction (absorbance) $E_L$ as above is measured (time interval 6 in FIG. 3). At the instant $t_1$ 250 µl diazo reagent are added and after intimate mixing and sufficient time for the drop of the optical transmission during the interval 7 a transmission value corresponding to the extinction (absorbance) $E_D$ is measured. At the instant $t_2$ 1,000 µl caffeine solution are added. As the quantity of diazo reagent added initially had been in excess, also in the interval 8 sufficient reagent still exists to react with the combined bilirubin set free by the caffeine from its bond. After intimate mixing and sufficient time for the drop of the optical transmission, a transmission value corresponding to the extinction (absorbance) $E_G$ is measured for the total bilirubin.

From the extinction values determined in this manner, after corresponding correction and subtraction of the extinction values mentioned hereinbefore for free and total bilirubin, respectively, the value of the combined bilirubin is obtained, which can be converted to appropriate concentration values by means of the calibration curve set up for a wavelength of 530 nm.

From this description, the saving in time, reagents and sample volumes in the method of the invention as compared with the prior art method of the bilirubin determination becomes obvious.

Figure 4:
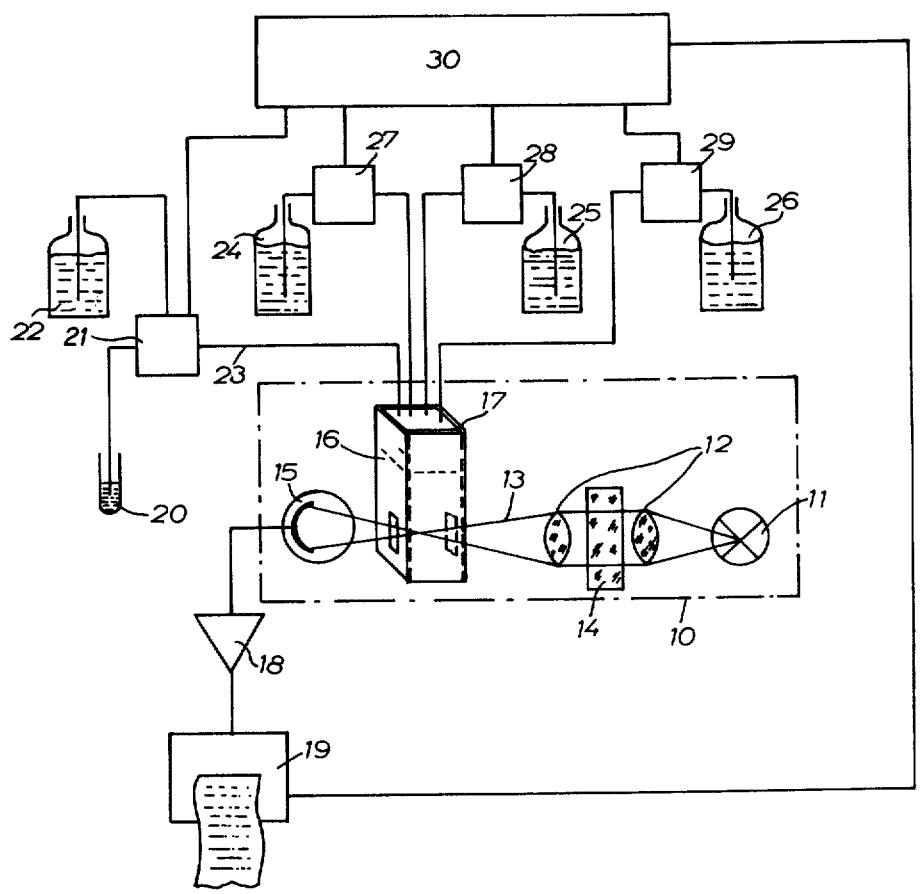
FIG. 4 illustrates schematically a device for carrying out the method of the invention.

FIG. 4 illustrates schematically an exemplary embodiment of a device for carrying out the above method. Therein, reference numeral 10 generally designates a photometer comprising a light source 11, a lens system 12, a cell 17, a photoelectric detector 15 and a suitable light filter 14. The photoelectric detector is connected with a prior art measuring, computing, and recording device 18, 19. The sample contained in the vessel 20 is fed into the cell 17 by means of a feeding device 21 operating according to the diluter principle via the conduit 23 by adding the diluent (common salt solution) taken from the reservoir 22; the feeding device 21 is connected with the control unit 30. Further reservoirs 24, 25, 26 are provided, which by means of respective feeding devices 27, 28, 29 and an associated conduit, transfer a specific reagent in metered volume into the cell 17; the feeding devices 27, 28, 29 are also connected with the control unit 30. The control unit 30 is further connected to the measuring, computing, and recording device 18, 19.

Furthermore, there are provided (but not illustrated) a mixing device for intimately mixing the contents of the cell 17 as well as, optionally, an arrangement for cleaning the cell prior to or after each completion of the entire process as well as means for maintaining the cell at a thermostatically controlled temperature and optionally the reagents (in the reservoirs).

The device permits the method of the invention to be automatically and reproducibly accomplished, and under control of the programming of the control unit 30 at every desired instant a signal corresponding to the optical transmission of the cell, at the detector 15 can be supplied to the computing and recording device and can be recorded, for instance, printed out, as an extinction (absorbance) or concentration value.

By way of example, the control device may be constituted by a controller drum driven at a preset constant speed, by which in a desired time sequence contacts controlling the feeding devices 21, 27, 28, 29 and the computing device 19 are closed.

In the first method step, by means of the diluter device 21 a sample volume of 200 µl withdrawn from the vessel 20 via the conduit 23 and a quantity of 1,000 µl common salt solution withdrawn from reservoir 22 are supplied to the cell 17. This process, as well as the entire sequence of steps of the method, is caused to occur by the control unit 30. After a short time, predetermined by the control unit 30, the signal corresponding to the optical transmission of the cell is derived from the detector 15 and stored in the device 18, 19. Thereafter, by means of feeding device 27, actuated accordingly by the control unit 30, a metered volume of 250 µl diazo reagent is withdrawn from the reservoir 24 and supplied to the cell. Then, also under instructions from the control unit 30, the mixing device is actuated and the content of the cell is mixed intimately. After a time given by the control unit 30 (or also during this time as well) the signal applied across the detector 15 and corresponding to the optical transmission of the cell, is supplied to the device 18, 19 and recorded as a computed extinction (absorbance) value and/or concentration value for the free bilirubin. After this time, the feeding device 28 is actuated by the control unit 30, which feeds a metered volume of 1,000 µl caffeine solution into the cell 17; subsequently, the mixing device is again actuated and as described previously, the computed extinction (absorbance) value and/or concentration value of the total bilirubin is recorded. Provision may be made for subtraction of these values to be also carried out in the computing unit, and also to record this resulting concentration value for the combined bilirubin. After completion of the measurement a cleansing agent can be withdrawn from the reservoir 26 in a manner determined by the control unit 30 by means of the feeding device 29, and the cell 17 can be rinsed with it so that it is subsequently ready for another cycle of the type described hereinbefore.

Figure 5:
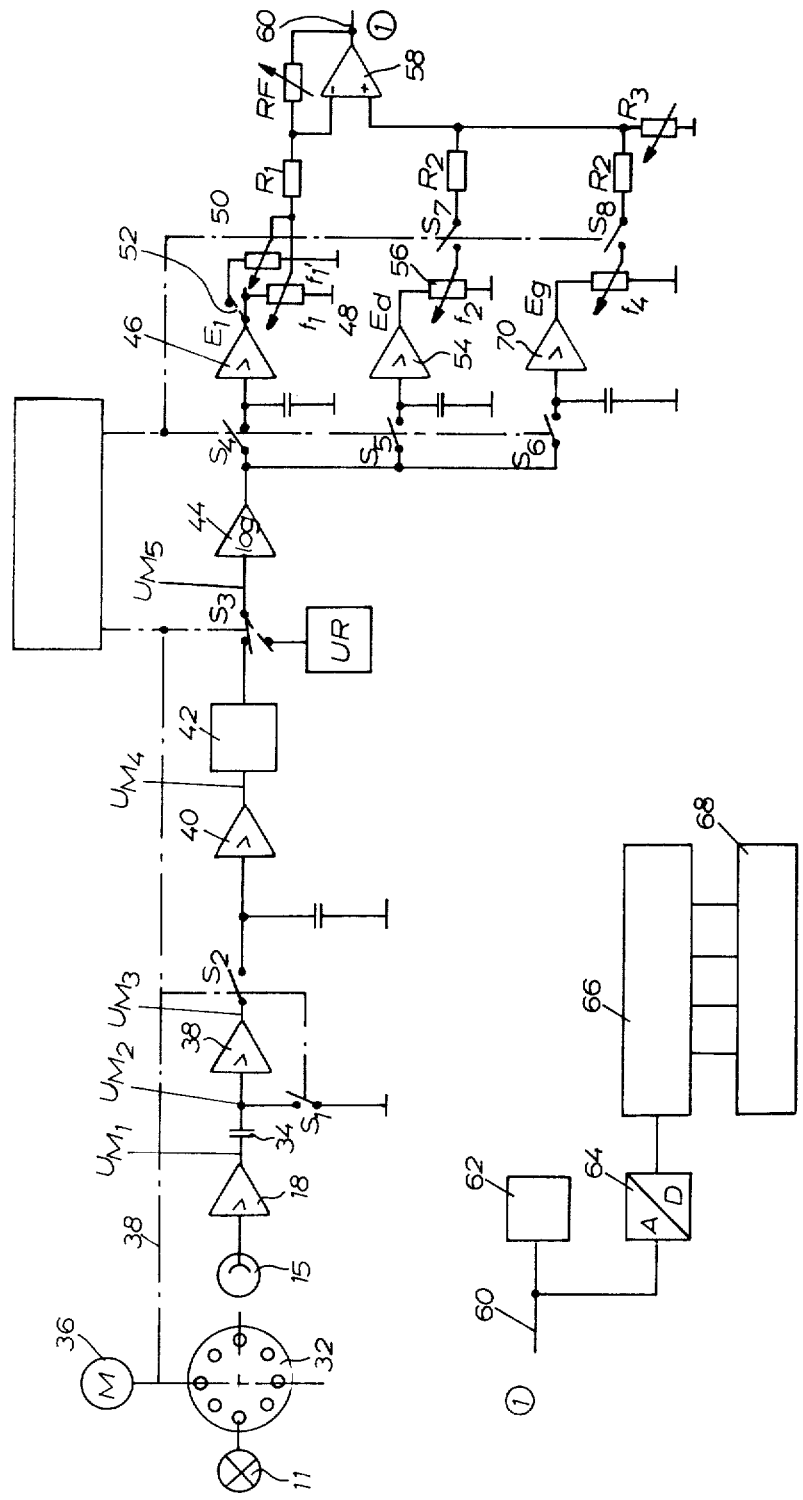
FIG. 5 illustrates a circuit arrangement for signal processing according to the invention.

FIG. 5 illustrates schematically but in detail the measuring, computing, and recording unit 18, 19 of FIG. 4.

From the curves of FIG. 3 the following mathematical connections are obtained for the determination of the concentrations:

$$c = f_3 (f_2 E_D - f_1 E_L)$$
$$c_1 = f_5 (f_4 E_G - f_1' E_L).$$

Therein, $c$ and $c_1$ are the respective concentrations of free and total bilirubin, respectively, $f_1'$ and $f_1$ to $f_5$, respectively, are the calibration factors, and $E_D$, $E_L$, $E_G$ are the different extinctions. The extinctions (absorbances) are known to be obtained from the transmission D according to the following expression:

$$E = \log (1/D).$$

Figure 6:
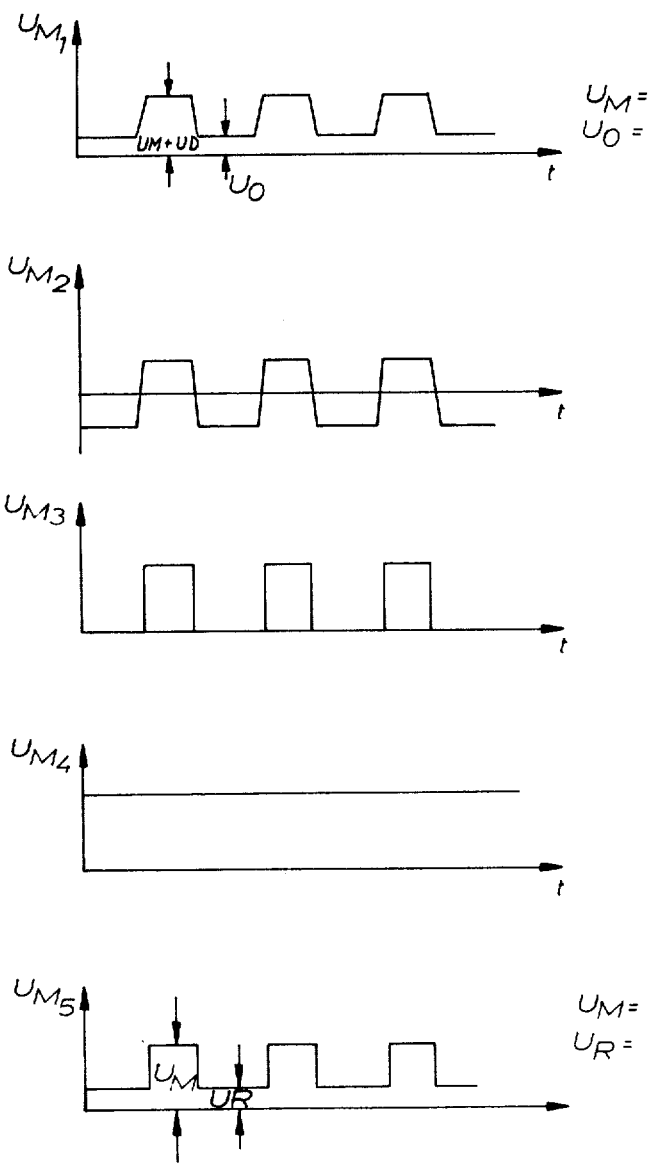
FIG. 6 illustrates the different signal waveforms obtained in the circuit of FIG. 5.

The photoelectric detector 15 receives the light beam 13 (FIG. 4) from the light source 11 which is chopped by means of a chopper disk 32. The detector signal which is amplified by the amplifier 18 thus is comprised of the measuring voltage $U_M$ and the dark voltage $U_o$ which occur alternatingly according to the signal waveform $U_{M1}$ in FIG. 6. By the capacitative coupling via the capacitor 34 the direct current proportion is eliminated, and a signal waveform $U_{M2}$ is obtained (FIG. 6). The chopper disk 32 is driven by a motor 36. As is indicated by the dotted line 38 contacts S1, S2, S3 are controlled synchronously with the beam interruption effected by the chopper disk 32. By means of a clamping circuit comprised of the contacts S1·S2 and an amplifier 38 a curve form $U_{M3}$ (FIG. 6) is produced. S1 and S2 are switched alternatingly at the same frequency as (synchronously with) the chopper disk interruption frequency such that during the pulse gap S1 is closed and S2 is open. For the duration of the pulse, thus white light impinges upon the detector 15, S1 is open and S2 is closed. $U_{M3}$ then only contains the useful signal.

In a hold circuit 40 a rectified signal $U_{M4}$ is produced from the measuring signal $U_{M3}$. Behind a filter circuit 42 containing the switch S3, switching is effected alternately between the filtered voltage $U_{M4}$ and a reference voltage $U_R$ in synchronism with the chopper interrupting frequency. At the input of a logarithmic circuit 44 a signal waveform $U_{M5}$ (FIG. 6) is obtained. This method is necessary since a logarithmic circuit for a d.c. voltage input is considerably dependent on temperature. Since furthermore logarithmic amplifiers do not operate near 0 volt input voltage, a simple chopping of the d.c. voltage $U_{M4}$ is not sufficient. For this reason, alternate switching is effected between $U_{M4}$ and $U_R$. In the subsequent difference formation according to the above equations for $c$ and $c_1$, respectively, the reference voltage $U_R$ drops out again automatically:

$$E_2 - E_1 = \log (U_{M42}/U_R) - \log (U_{M41}/U_R)$$
$$= \log U_{M42} - \log U_R - \log U_{M42} - \log U_R$$
$$= \log U_{M42} - \log U_{M41}$$

The transmission $D_L$ measured at the instant $t_1$ (FIG. 3) is converted by the logarithmic circuit 44 to the extinction (absorbance) $E_L = \log (1/D_L)$ and is supplied via switch S4 to a hold circuit 46. Here, the extinction signal is stored and by potentiometers 48 and 50 can be provided with adjustable factors $f_1$ and $f_1'$, respectively. By a switch 52 the output of the hold circuit can alternately be applied to the potentiometer 48 or to the potentiometer 50. The taps of the potentiometers 48 and 50 are interconnected.

By means of a switch S5 the extinction $E_D$ is stored in a hold circuit 54 at the instant $t_2$. By means of a potentiometer 56 this stored value can be multiplied electrically by an adjustable factor $f_2$ provided by potentiometer 56.

The interconnected taps of the potentiometers 48 and 50 connect to the inverting input of a differential amplifier 58 via a resistor $R_1$. The tap of the potentiometer 56 connects to the non-inverting input of the same differential amplifier 58 via a switch S7 and a resistor $R_2$ (equal in value to $R_1$). A variable feedback resistor $R_F$ connects the output of the amplifier 58 to its inverting input. Upon closing of switch S7 and positioning of the switch 52 to energize the potentiometer 48, a signal analogous to the concentration $c$ appears at the output 60 of the differential amplifier 58:

$$c = (R_F/R_1) (f_2 E_D - f_1 E_L),$$

wherein $(R_F/R_1)$, equal to $f_3$, is a suitably adjusted factor. By means of an analog indicating device 62 this signal can be indicated and moreover after conversion to digital form by means of an analog-to-digital converter 64, can be stored in a storage 66 and printed out by means of a digital printer 68.

By means of switch S6, a hold circuit 70 including a potentiometer 72 for the adjustment of factor $f_4$ as well as another switch S8 both of which close at the instant $t_3$ (FIG. 3) and upon change-over of the switch 52 to the potentiometer 50, a signal is formed proportional to:

$$C_1 = (R_F/R_1) (f_4 E_G - f_1' E_L)$$

The feedback resistor $R_F$ can be adjusted so that $R_F/R_1$ becomes $f_5$. In this manner the desired concentration of the free bilirubin ($c$) and the total bilirubin ($c_1$) are obtained directly. The combined bilirubin is, of course, equal to $c_1 - c$ and is therefore also obtained readily.

We claim:

1. A method for the quantitative photometric determination of substantially colorless components of a sample by reaction with a color-producing reagent and subsequent determination of the absorbance of the colored reaction product at a specific wavelength, comprising as a first group of steps, introducing a metered sample volume into a cell (17) and dilution by a metered quantity of a diluent and after intimate mixing a first optical transmission value corresponding to the blank value is measured;

and as a second group of steps, a metered quantity of a color-producing reagent is added to the sample and diluent and after intimate mixing a second optical transmission value is measured.

2. A method as claimed in claim 1 for the determination of at least two components in a sample, a first component being determinable directly and a second component only after adding another reagent, further comprising:

a third group of steps, a metered quantity of a second color-producing reagent is added to the sample, diluent and first reagent mixture and after intimate mixing a third optical transmission value is measured.

3. A method as claimed in the claim 2 for the determination of a sample component present partially in a free and partially in a combined quantity, in which:

in said second group of steps, a metered excess quantity of the first color-producing reagent is added and a third transmission value corresponding to the free partial quantity is measured, while in the third group of steps, a metered quantity of another reagent for setting free the combined partial quantity is added and a transmission value corresponding to the total quantity is measured.

4. A method as claimed in claim 1, in which:

from the measured transmission values are computed quantities at least proportional to the respective absorbance (extinction) and concentration values, which may then be directly recorded.

5. A method as claimed in the claim 4, in which:

the change of said quantities at least proportional to the respective absorbance (extinction) and concentration with time is recorded.

6. A method as claimed in claim 1, in which:

the supply of the metered sample and reagent volumes to the cell (17) successively is accomplished in a controlled time sequence, and the intimate mixing and optical measurement are carried out automatically.

* * * * *